United States Patent

Suzuki et al.

Patent Number: 5,110,497
Date of Patent: May 5, 1992

[54] COMPONENT FOR LIQUID CRYSTAL COMPOSITION AND LIQUID CRYSTAL COMPOSITION CONTAINING THE SAME

[75] Inventors: Yoshiichi Suzuki; Shigenori Sakuma; Noriko Yamakawa, all of Tokyo, Japan

[73] Assignee: Showa Shell Sekiyu K.K., Tokyo, Japan

[21] Appl. No.: 646,115

[22] Filed: Jan. 28, 1991

[30] Foreign Application Priority Data

Jan. 26, 1990 [JP] Japan .................. 2-17459

[51] Int. Cl.$^5$ .................. C09K 19/12; C09K 19/52; C07C 69/76
[52] U.S. Cl. .................. 252/299.65; 252/299.01; 252/299.64; 560/59; 560/65; 560/83; 560/64
[58] Field of Search .................. 252/299.01, 299.64, 252/299.65; 560/59, 60, 61, 62, 64, 65, 83

[56] References Cited

U.S. PATENT DOCUMENTS

4,886,619 12/1989 Janulis .................. 252/299.1
4,911,861 3/1990 Higuchi et al. .................. 252/299.65
4,921,632 5/1990 Nakamura et al. .................. 252/299.1

FOREIGN PATENT DOCUMENTS

0327349 2/1989 European Pat. Off.
1-230548 9/1989 Japan.
8909764 10/1989 World Int. Prop. O.

OTHER PUBLICATIONS

Dewent Abstract of JP-A-1-230548.

Primary Examiner—Robert L. Stoll
Assistant Examiner—Shean C. Wu
Attorney, Agent, or Firm—Sughrue, Mion, Zinn, Macpeak & Seas

[57] ABSTRACT

An optically active compound represent by formula (I):

$$R_1-X-(A)-Y-(B)-Z-\overset{R_3}{\underset{*}{C}H}-R_2 \qquad (I)$$

wherein $R_1$ represents a fluoroalkyl group having from 1 to 18 carbon atoms; $R_2$ represents an alkyl group having from 1 to 16 carbon atoms and an aralkyl group having from 6 to 16 carbon atoms; $R_3$ represents $C_2F_5$, $CF_3$, $CHF_2$, or $CH_2F$; X represents a single bond, —O—, —COO—, or —OCO—; Y represents —COO—, —OCO—, —CH$_2$O—, or —OCH$_2$—; Z represents —COO— or —O—; (A) and (B) each represent a cyclic group; and * indicates an optically active center, and a liquid crystal composition containing at least one of said optically active compounds are disclosed. The compound is useful not only as a liquid crystal compound but as a chiral dopant to provide a liquid crystal composition exhibiting a chiral smectic phase.

4 Claims, 2 Drawing Sheets

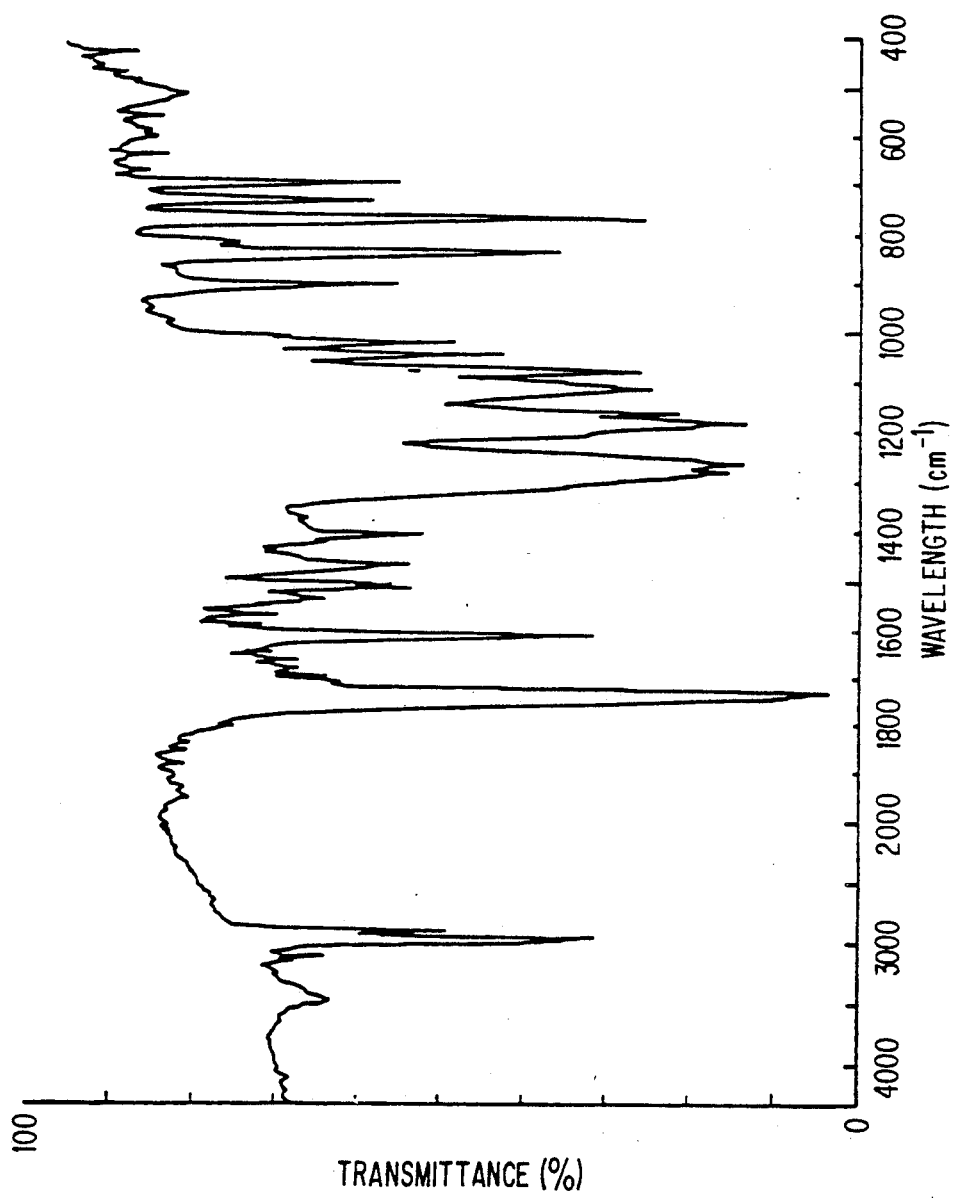

COMPONENT FOR LIQUID CRYSTAL COMPOSITION AND LIQUID CRYSTAL COMPOSITION CONTAINING THE SAME

FIELD OF THE INVENTION

This invention relates to a novel and excellent ferroelectric liquid crystal compound or component for a liquid crystal composition and to a novel liquid crystal composition containing the same. More particularly, it relates to a ferroelectric liquid crystal compound which serves as a component constituting a liquid crystal composition to endow the composition with a chiral smectic phase and to a liquid crystal composition containing the same.

BACKGROUND OF THE INVENTION

In recent years, liquid crystal display elements of TN mode have been widely used in display systems, such as watches and table calculators. Liquid crystal materials used in TN mode display elements include nematic liquid crystals and nematic-cholesteric liquid crystals. However, these liquid crystals have a slow electro-optic response and also have difficulty in driving by a high multiplex system on an account of the fact that the driving force for moving molecules in response to an electric field is basically based on anisotropy of their dielectric constant.

In expectation of settlement of these problems, smectic liquid crystals, particularly chiral smectic liquid crystals exhibiting ferroelectric properties have recently been receiving extensive studies since Clark and Lagawall made a report in 1980 on the characteristics of these liquid crystals, which are of extreme importance for display devices, such as a high rate of response on the level of submicrosecond, a memory effect ascribed to bistability, and existence of a threshold value in voltage for writing. Because of these excellent characteristics, smectic liquid crystals and, in particular, chiral smectic liquid crystals have been attracting attention as a new material for use in display elements, and applications to large-capacity displays, memory type displays, and optical modulation elements have been attempted to date.

Performance properties required for liquid crystal materials, particularly ferroelectric liquid crystals, on practical use include (1) chemical and photochemical stability for assuring durability, (2) capability of exhibiting a liquid crystal phase in a wide temperature range from low to high and exhibiting ferroelectric properties in a temperature range including room temperature, (3) small rotation viscosity and high spontaneous polarization which make it feasible to obtain a high rate of response, (4) proper birefringence to agree with an increase in display contrast, (5) a balance of modulus of elasticity suited for dynamic driving, and (6) an appropriate angle of tilt for obtaining a high display contrast.

While various liquid crystal materials have hitherto been synthesized based on these designs, there has been developed no liquid crystal material which satisfies all the performance requirements even when used singly. Accordingly, the functions demanded for liquid crystal display systems have been fulfilled in practice by preparing a multi-component mixed liquid crystal composition comprising several to ten and several different kinds of liquid crystal materials instead of individual use thereof.

Currently available mixed liquid crystal compositions in which physical properties of a ferroelectric liquid crystal are properly adjusted are roughly classified into two types; one prepared by mixing a plurality of liquid crystal compounds showing a chiral smectic phase, and the other prepared by incorporating a liquid crystal or component showing a smectic phase (hereinafter referred to as a chiral dopant).

In the former type of compositions, it is believed relatively easy to achieve a desired extension of a temperature range wherein a chiral smectic C phase is exhibited and a desired increase in spontaneous polarization which is reflected on a rate of response to an applied electric field. However, since liquid crystal compounds showing high spontaneous polarization have such a molecular structure that the dipole is positioned close to an asymmetric carbon atom, the molecules not only have a high spontaneous polarization but also tends to have a high rotation viscosity. It follows that the resulting liquid crystal composition has difficulty in attaining a high rate of response sufficient for dynamic image display at temperatures in the vicinity of room temperature.

In the latter type of compositions, the liquid crystal or liquid crystal composition showing a smectic C phase which serves as a main component of the composition (hereinafter referred to as a mother liquid crystal) does not need to be optically active by itself and may be mixed with other components in various manners so as to satisfy the above-described requirements. Optically active compounds which, while not limited, preferably exhibit a crystal phase are added to the mother liquid crystal to realize a chiral smectic C phase and to induce appropriate spontaneous polarization to thereby provide a ferroelectric liquid crystal composition having a high rate of response.

According to the latter system, a liquid crystal composition in which the mother liquid crystal has a low viscosity can be prepared. Addition of the chiral dopant makes it feasible to control a spontaneous polarization or the spiral pitch of the chiral smectic C phase, thereby obtaining an electro-optic element having satisfactory characteristics, such as a rate of response, orientation properties, and a display contrast. For these reasons, this system is steadily extending its applicability to production of practical materials. From such a technical viewpoint, there has been a strong demand for optically active or inactive mother liquid crystals and chiral dopants which exhibit excellent performance characteristics.

SUMMARY OF THE INVENTION

An object of this invention is to provide a novel and excellent ferroelectric liquid crystal compound or chiral dopant for liquid crystal compositions.

Another object of the present invention is to provide a novel liquid crystal composition containing such a ferroelectric liquid crystal compound or chiral dopant.

The present invention relates to a liquid crystal compound or a component for a liquid crystal composition, which is an optically active compound represented by formula (I):

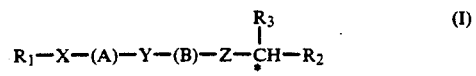

wherein $R_1$ represents a fluoroalkyl group having from 1 to 18 carbon atoms; $R_2$ represents an alkyl group having from 1 to 16 carbon atoms and an aralkyl group having from 6 to 16 carbon atoms; $R_3$ represents $C_2F_5$, $CF_3$, $CHF_2$, or $CH_2F$; X represents a single bond, -O-, -COO-, or -OCO-; Y represents -COO-, -OCO-, -CH$_2$O-, or -OCH$_2$-; Z represents -COO- or -O-; (A) and (B) each represent a cyclic group; and * indicates an optically active center.

The present invention also relates to a liquid crystal composition and, in particular, a liquid crystal composition exhibiting a chiral smectic phase, which contains at least one of the compounds represented by formula (I).

BRIEF DESCRIPTION OF THE DRAWINGS

FIGS. 1 and 2 each show an infrared absorption spectrum of the compound obtained in Example 1 and 2, respectively.

DETAILED DESCRIPTION OF THE INVENTION

Figure 1:
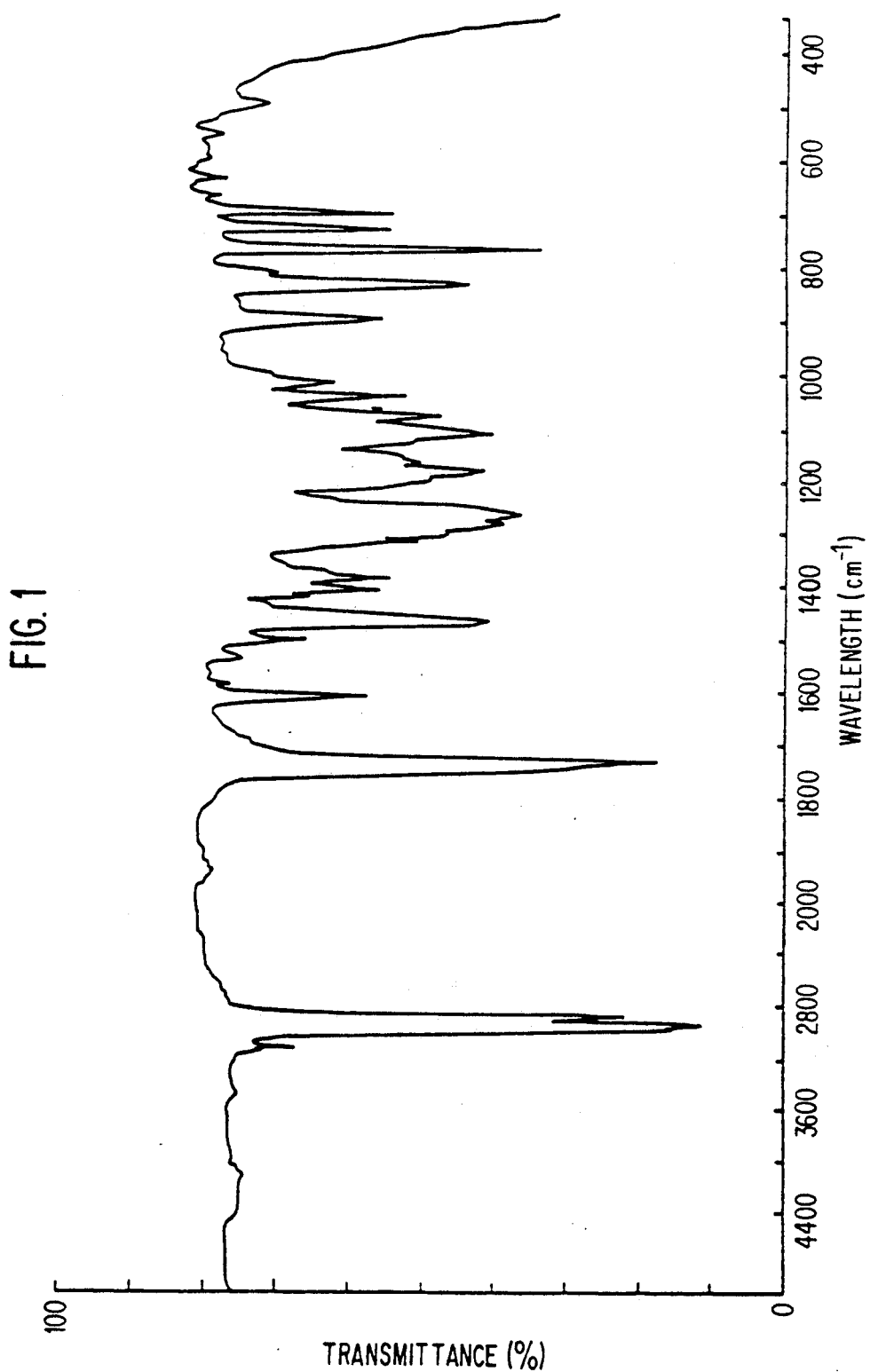

In formula (I), specific examples of the cyclic group as represented by (A) or (B) are shown below. In the following groups, one to four hydrogen atoms may be substituted by a fluorine atom, or one or two hydrogen atoms may be substituted by a chlorine atom, a bromine atom, a cyano group, a nitro group, or a trifluoromethyl group.

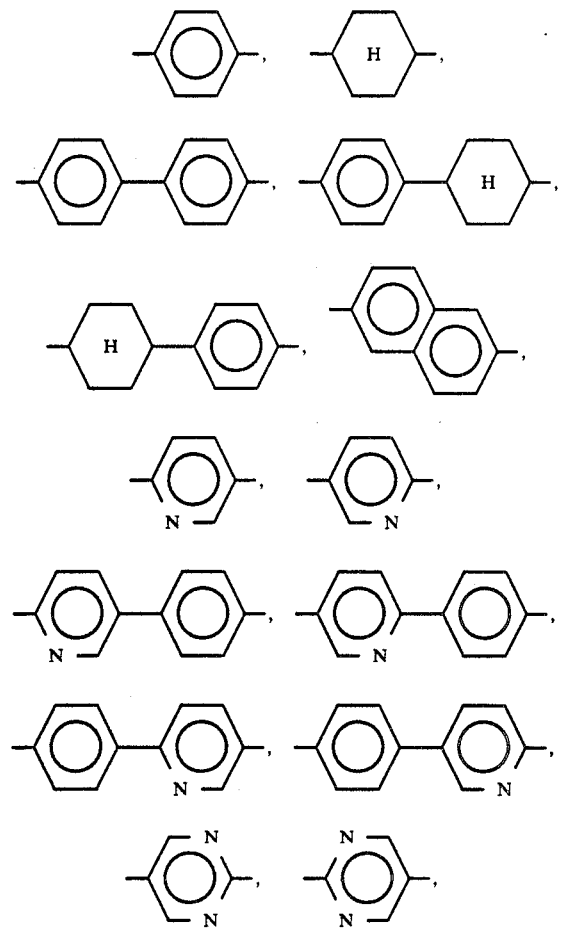

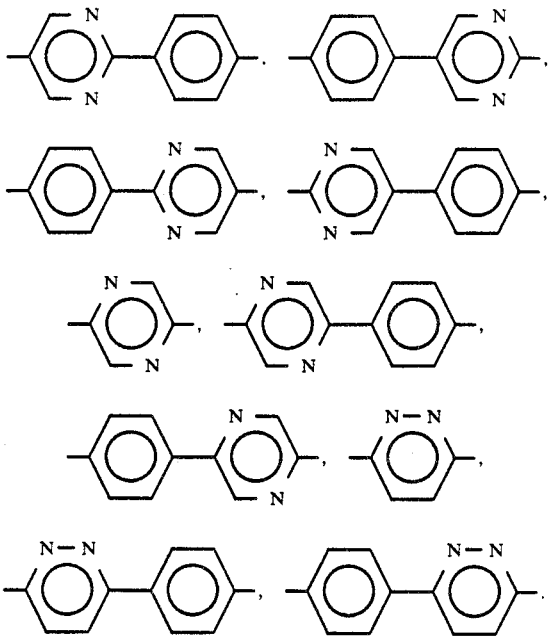

In formula (I), $R_1$ preferably represents a fluoroalkyl group containing from 4 to 16 carbon atoms, i.e., a straight chain alkyl group, e.g., an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, and an n-octadecyl group, with a fluorine atom therein. Fluoroalkyl groups in which a part of the straight chain moiety is of perfluoro type are preferred. In particular, those represented by $C_lF_{2l-1}-(CH_2)_k-$, wherein l is from 1 to 12 and k is from 0 to 2, are suitable.

$R_2$ includes a straight chain alkyl group, a branched alkyl group, and an aralkyl group. The straight chain or branched alkyl group preferably contains from 1 to 12 carbon atoms, including, for example, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n- tridecyl group, an n-tetradecyl group, an n-pentadecyl group, an n-hexadecyl group, an n-heptadecyl group, an n-octadecyl group, a 1-methylbutyl group, a 2-methylbutyl group, a 3-methylbutyl group, a 1-methylpentyl group, a 2-methylpentyl group, a 1-methylhexyl group, and a 1-methylheptyl group. Examples of the aralkyl group are a phenyl group, a benzyl group, a phenethyl group, and a substituted (by, e.g., methyl, ethyl, benzyl, benzoyloxy, halogen) phenyl group.

$R_3$ includes $C_2F_5$, $CF_3$, $CHF_2$, and $CH_2F$.

The compounds according to the present invention can be generally synthesized by reacting an optically active haloalkyl-2-alkanol and benzyloxybenzoic acid chloride to prepare an ester compound, hydrogenating the ester in the presence of a catalyst, e.g., palladium-on-carbon, to prepare a phenol derivative of the optically active haloalkyl-2-alkanol represented by formula (II):

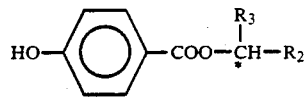

wherein $R_2$ and $R_3$ are as defined above, and reacting the phenol derivative of formula (II) with an acid chloride of a 4-fluoroalkyloxy-4'-biphenylcarboxylic acid represented by formula (III):

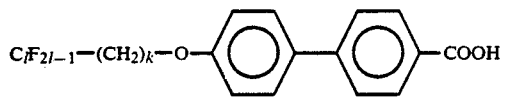

wherein l is from 1 to 12; and k is from 0 to 2, in an inert solvent, e.g., methylene chloride, tetrahydrofuran, and diethyl ether, in the presence of a base, e.g., pyridine, dimethylamine, and triethylamine. To obtain a desired compound, i.e., a 4-(4''-fluoroalkyloxybiphenyl-4'-carbonyloxy)benzoic acid ester of the optically active haloalkyl-2-alkanol.

Alternatively, the compounds of the present invention may be prepared through esterification between the phenol derivative of an optically active haloalkyl-2-alkanol (II) and a 4-fluoroalkyloxy-4'-biphenylcarboxylic acid (III) by using a dehydrating condensating agent, e.g., dicyclohexylcarbodiimide.

The optically active compounds according to the present invention are enantiomers embracing an (R)-compound and an (S)-compound in the absolute configuration. The optical purity of the optically active compound is not particularly limited but is preferably 100 %ee (enantio-excess).

Specific examples of the compounds according to the present invention are shown below.
1) 4-Fluoroalkylbenzoic acid ester
2) 4-Fluoroalkyloxybenzoic acid ester
3) 4-Fluoroalkylcyclohexylcarboxylic acid ester
4) 4-Fluoroalkyloxycyclohexylcarboxylic acid ester
5) 4-Fluoroalkyl-4'-biphenylcarboxylic acid ester
6) 4-Fluoroalkoxy-4'-biphenylcarboxylic acid ester
7) 4-(4-Fluoroalkylphenyl)cyclohexylcarboxylic acid ester
8) 4-(4-Fluoroalkylcyclohexyl)benzoic acid ester
9) 4-(4-Fluoroalkoxyphenyl)cyclohexylcarboxylic acid ester
10) 4-(4-Fluoroalkoxycyclohexyl)benzoic acid ester
11) 4-(4-Fluoroalkylbenzoyloxy)benzoic acid ester
12) 4-(4-Fluoroalkoxybenzoyloxy)benzoic acid ester
13) 4-(4-Fluoroalkylcyclohexylcarbonyloxy)benzoic acid ester
14) 4-(4-Fluoroalkoxycyclohexylcarbonyloxy)benzoic acid ester
15) 4-(4-Fluoroalkylbenzoyloxy)cyclohexylcarboxylic acid ester
16) 4-(4-Fluoroalkoxybenzoyloxy)cyclohexylcarboxylic acid ester
17) 4-(4-Fluoroalkylbenzoyloxy)phenyl ether
18) 4-(4-Fluoroalkoxybenzoyloxy)phenyl ether
19) 4-(4-Fluoroalkylcyclohexylcarbonyloxy)phenyl ether
20) 4-(4-Fluoroalkoxycyclohexylcarbonyloxy)phenyl ether
21) 4-(4-Fluoroalkylbenzoyloxy)cyclohexyl ether
22) 4-(4-Fluoroalkoxybenzoyloxy)cyclohexyl ether
23) 4-Fluoroalkyl-4'-biphenylcarboxylic acid 4-alkoxycarbonylphenyl ester
24) 4-Fluoroalkoxy-4'-biphenylcarboxylic acid 4-alkoxycarbonylphenyl ester
25) 4-Fluoroalkyl-4'-cyclohexylbenzoic acid 4-alkoxycarbonylphenyl ester
26) 4-Fluoroalkoxy-4'-cyclohexylbenzoic acid 4-alkoxycarbonylphenyl ester
27) 4-Fluoroalkyl-4'-phenylcyclohexylcarboxylic acid 4-alkoxycarbonylphenyl ester
28) 4-Fluoroalkoxy-4'-phenylcyclohexylcarboxylic acid 4-alkoxycarbonylphenyl ester
29) 4-Fluoroalkyl-4'-biphenylcarboxylic acid 4-alkoxycarbonylcyclohexyl ester
30) 4-Fluoroalkoxy-4'-biphenylcarboxylic acid 4-alkoxycarbonylcyclohexyl ester
31) 4-Fluoroalkyl-4'-biphenylcarboxylic acid 4-alkoxycarbonylphenyl ether
32) 4-Fluoroalkoxy-4'-biphenylcarboxylic acid 4-alkoxycarbonylphenyl ether
33) 4-Fluoroalkyl-4'-cyclohexylbenzoic acid 4-alkoxycarbonylphenyl ether
34) 4-Fluoroalkoxy-4'-cyclohexylbenzoic acid 4-alkoxycarbonylphenyl ether
35) 4-Fluoroalkyl-4'-phenylcyclohexylcarboxylic acid 4-alkoxycarbonylphenyl ether
36) 4-Fluoroalkoxy-4'-phenylcyclohexylcarboxylic acid 4-alkoxycarbonylphenyl ether
37) 4-Fluoroalkyl-4'-biphenylcarboxylic acid 4-alkoxycarbonylcyclohexyl ether
38) 4-Fluoroalkoxy-4'-biphenylcarboxylic acid 4-alkoxycarbonylcyclohexyl ether
39) 4-Fluoroalkylbenzoic acid 4'-alkoxycarbonyl-4-biphenyl ester
40) 4-Fluoroalkoxybenzoic acid 4'-alkoxycarbonyl-4-biphenyl ester
41) 4-Fluoroalkylcyclohexylcarboxylic acid 4'-alkoxycarbonyl-4-biphenyl ester
42) 4-Fluoroalkoxycyclohexylcarboxylic acid 4'-alkoxycarbonyl-4-biphenyl ester
43) 4-Fluoroalkylbenzoic acid 4'-alkoxycarbonyl-4-cyclohexylphenyl ester
44) 4-Fluoroalkoxybenzoic acid 4'-alkoxycarbonyl-4-cyclohexylphenyl ester
45) 4-Fluoroalkylbenzoic acid 4'-alkoxycarbonyl-4-phenylcyclohexyl ester
46) 4-Fluoroalkoxybenzoic acid 4'-alkoxycarbonyl-4-phenylcyclohexyl ester
47) 4-Fluoroalkylbenzoic acid 4'-alkoxy-4-biphenyl ester
48) 4-Fluoroalkoxybenzoic acid 4'-alkoxy-4-biphenyl ester
49) 4-Fluoroalkylcyclohexylcarboxylic acid 4'-alkoxy-4-biphenyl ester
50) 4-Fluoroalkoxycyclohexylcarboxylic acid 4'alkoxy-4-biphenyl ester
51) 4-Fluoroalkylbenzoic acid 4'-alkoxy-4-cyclohexylphenyl ester
52) 4-Fluoroalkoxybenzoic acid 4'-alkoxy-4-cyclohexylphenyl ester
53) 4-Fluoroalkylbenzoic acid 4'-alkoxy-4-phenylcyclohexyl ester
54) 4-Fluoroalkoxybenzoic acid 4'-alkoxy-4-phenylcyclohexyl ester
55) 4-(4-Fluoroalkylphenylmethyleneoxy)benzoic acid ester 56) 4-(4-Fluoroalkoxyphenylmethyleneoxy)benzoic acid ester
57) 4-(4-Fluoroalkylcyclohexylmethyleneoxy)benzoic acid ester
58) 4-(4-Fluoroalkoxycyclohexylmethyleneoxy)benzoic acid ester
59) 4-(4-Fluoroalkylphenyloxymethylene)benzoic acid ester
60) 4-(4-Fluoroalkoxyphenyloxymethylene)benzoic acid ester
61) 4-(4-Fluoroalkylcyclohexyloxymethylene)benzoic acid ester
62) 4-(4-Fluoroalkoxycyclohexyloxymethylene)benzoic acid ester
63) 4-(4-Fluoroalkylphenylmethyleneoxy) cyclohexylcarboxylic acid ester
64) 4-(4-Fluoroalkoxyphenylmethyleneoxy)cyclohexylcarboxylic acid ester
65) 4-(4-Fluoroalkylphenyloxymethylene)cyclohexylcarboxylic acid ester
66) 4-(4-Fluoroalkoxyphenyloxymethylene)cyclohexylcarboxylic acid ester
67) 4-(4-Fluoroalkylphenylmethyleneoxy)phenyl ether
68) 4-(4-Fluoroalkoxyphenylmethyleneoxy)phenyl ether
69) 4-(4-Fluoroalkylcyclohexylmethyleneoxy)phenyl ether
70) 4-(4-Fluoroalkoxycyclohexylmethyleneoxy)phenyl ether
71) 4-(4-Fluoroalkylphenyloxymethylene)phenyl ether
72) 4-(4-Fluoroalkoxyphenyloxymethylene)phenyl ether
73) 4-(4-Fluoroalkylcyclohexyloxymethylene)phenyl ether
74) 4-(4-Fluoroalkoxycyclohexyloxymethylene)phenyl ether
75) 4-(4-Fluoroalkylphenylmethyleneoxy)cyclohexyl ether
76) 4-(4-Fluoroalkoxyphenylmethyleneoxy)cyclohexyl ether
77) 4-(4-Fluoroalkylphenyloxymethylene)cyclohexyl ether
78) 4-(4-Fluoroalkoxyphenyloxymethylene)cyclohexyl ether
79) 4-(4-Fluoroalkylcyclohexyloxymethylene)cyclohexyl ether
80) 4-(4-Fluoroalkoxycyclohexyloxymethylene)cyclohexyl ether
81) 4-(4-Fluoroalkylbiphenylmethyleneoxy)benzoic acid ester
82) 4-(4-Fluoroalkoxybiphenylmethyleneoxy)benzoic acid ester
83) 4-(4-Fluoroalkylcyclohexylphenylmethyleneoxy)benzoic acid ester
84) 4-(4-Fluoroalkoxycyclohexylphenylmethyleneoxy)benzoic acid ester
85) 4-(4-Fluoroalkylbiphenyloxymethylene)benzoic acid ester
86) 4-(4-Fluoroalkoxybiphenyloxymethylene)benzoic acid ester
87) 4-(4-Fluoroalkylcyclohexylphenyloxymethylene)benzoic acid ester
88) 4-(4-Fluoroalkoxycyclohexylphenyloxymethylene)benzoic acid ester
89) 4-(4-Fluoroalkylbiphenylmethyleneoxy)cyclohexylcarboxylic acid ester
90) 4-(4-Fluoroalkoxybiphenylmethyleneoxy)cyclohexylcarboxylic acid ester
91) 4-(4-Fluoroalkylbiphenyloxymethylene)cyclohexylcarboxylic acid ester
92) 4-(4-Fluoroalkoxybiphenyloxymethylene)cyclohexylcarboxylic acid ester
93) 4-(4-Fluoroalkylbiphenylmethyleneoxy)phenyl ether
94) 4-(4-Fluoroalkoxybiphenylmethyleneoxy)phenyl ether
95) 4-(4-Fluoroalkylcyclohexylphenylmethyleneoxy)phenyl ether
96) 4-(4-Fluoroalkoxycyclohexylphenylmethyleneoxy)phenyl ether
97) 4-(4-Fluoroalkylbiphenyloxymethylene)phenyl ether
98) 4-(4-Fluoroalkoxybiphenyloxymethylene)phenyl ether
99) 4-(4-Fluoroalkylcyclohexylphenyloxymethylene)phenyl ether
100) 4-(4-Fluoroalkoxycyclohexylphenyloxymethylene)phenyl ether
101) 4-(4-Fluoroalkylbiphenylmethyleneoxy)cyclohexyl ether
102) 4-(4-Fluoroalkoxybiphenylmethyleneoxy)cyclohexyl ether
103) 4-(4-Fluoroalkylbiphenyloxymethylene)cyclohexyl ether
104) 4-(4-Fluoroalkoxybiphenyloxymethylene)cyclohexyl ether
105) 4-(4-Fluoroalkylphenylmethyleneoxy)biphenylcarboxylic acid ester
106) 4-(4-Fluoroalkoxyphenylmethyleneoxy)biphenylcarboxylic acid ester
107) 4-(4-Fluoroalkylcyclohexylmethyleneoxy)biphenylcarboxylic acid ester
108) 4-(4-Fluoroalkoxycyclohexylmethyleneoxy)biphenylcarboxylic acid ester
109) 4-(4-Fluoroalkylphenylmethyleneoxy)phenylcyclohexylcarboxylic acid ester
110) 4-(4-Fluoroalkoxyphenylmethyleneoxy)phenylcyclohexyl carboxylic acid ester
111) 4-(4-Fluoroalkylphenylmethyleneoxy)cyclohexylcarboxylic acid ester
112) 4-(4-Fluoroalkoxyphenylmethyleneoxy)cyclohexylphenylcarboxylic acid ester
113) 4-(4-Fluoroalkylphenylmethyleneoxy)biphenyl ether
114) 4-(4-Fluoroalkoxyphenylmethyleneoxy)biphenyl ether
115) 4-(4-Fluoroalkylcyclohexylmethyleneoxy)biphenyl ether
116) 4-(4-Fluoroalkoxycyclohexylmethyleneoxy)biphenyl ether
117) 4-(4-Fluoroalkylphenylmethyleneoxy)phenylcyclohexyl ether
118) 4-(4-Fluoroalkoxyphenylmethyleneoxy)phenylcyclohexyl ether
119) 4-(4-Fluoroalkylphenylmethyleneoxy)cyclohexylphenyl ether
120) 4-(4-Fluoroalkoxyphenylmethyleneoxy)cyclohexylphenyl ether
121) 4-(4-Fluoroalkylphenoxycarbonyl)phenyl ether
122) 4-(4-Fluoroalkoxyphenoxycarbonyl)phenyl ether
123) 4-(4-Fluoroalkylbiphenyloxycarbonyl)benzoic acid ester
124) 4-(4-Fluoroalkoxybiphenyloxycarbonyl)benzoic acid ester
125) 4-(4-Fluoroalkylcyclohexylphenyloxycarbonyl)benzoic acid ester 126) 4-(4-Fluoroalkoxyphenylcyclohexyloxycarbonyl)-benzoic acid ester
127) 4-(4-Fluoroalkylbiphenyloxycarbonyl)cyclohexylcarboxylic acid ester
128) 4-(4-Fluoroalkoxybiphenyloxycarbonyl)cyclohexylcarboxylic acid ester
129) 4-(4-Fluoroalkylbiphenyloxycarbonyl)phenyl ether
130) 4-(4-Fluoroalkoxybiphenyloxycarbonyl)phenyl ether
131) 4-(4-Fluoroalkylcyclohexylphenyloxycarbonyl)-phenyl ether
132) 4-(4-Fluoroalkoxyphenylcyclohexyloxycarbonyl)-phenyl ether 2) (R)-(+)-4-n-1H,1H-Perfluorobutyloxy-4'-biphenylcarboxylic acid 4-(1-Trifluoromethylheptyloxycarbonyl)phenyl ester:

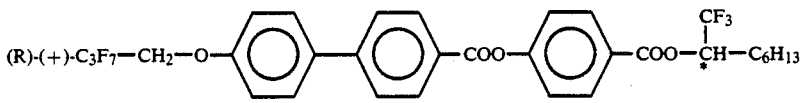

133) 4-(4-Fluoroalkylbiphenyloxycarbonyl)cyclohexyl ether
134) 4-(4-Fluoroalkoxybiphenyloxycarbonyl)cyclohexyl ether
135) 4-(4-Fluoroalkylphenoxycarbonyl)biphenylcarboxylic acid ester
136) 4-(4-Fluoroalkoxyphenoxycarbonyl)biphenylcarboxylic acid ester
137) 4-(4-Fluoroalkylcyclohexyloxycarbonyl)biphenylcarboxylic acid ester
138) 4-(4-Fluoroalkoxycyclohexyloxycarbonyl)biphenylcarboxylic acid ester
139) 4-(4-Fluoroalkylphenoxycarbonyl)biphenyl ether
140) 4-(4-Fluoroalkoxyphenoxycarbonyl)biphenyl ether
141) 4-(4-Fluoroalkylcyclohexyloxycarbonyl)biphenyl ether
142) 4-(4-Fluoroalkoxycyclohexyloxycarbonyl)biphenyl ether In addition, the above-enumerated compounds with the alkyl or alkoxy moiety thereof is replaced by the corresponding alkoxycarbonyl, alkylcarbonyloxy or alkanoyl moiety are also included in the compounds of the present invention.

The present invention is now illustrated in greater detail by way of Examples, but it should be understood that the present invention is not deemed to be limited thereto. In the examples, all the percents and parts are by weight unless otherwise indicated.

EXAMPLE 1

1) 4-Hydroxybenzoic acid 1-Trifluoromethyl-2-heptyl Ester:

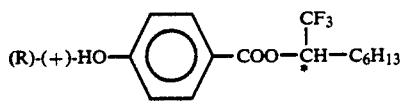

To 5 ml of a methylene chloride solution containing 0.56 g of 4-benzyloxybenzoic acid chloride was slowly added a solution of 0.38 g of (R)-(+)-1-trifluoromethylheptanol and 0.23 g of triethylamine in 5 ml of methylene chloride under ice-cooling. The mixture was allowed to warm to room temperature and stirred at that temperature for 12 hours. The reaction mixture was poured into ice-water and extracted with methylene chloride. The methylene chloride phase was washed successively with diluted hydrochloric acid, water, an aqueous 1N sodium carbonate solution, and water and dried over anhydrous magnesium sulfate. The solvent was removed by distillation under reduced pressure, and the residual crude product was purified by silica gel column chromatography to obtain 0.53 g of (R)-(+)-4-benzyloxybenzoic acid 1-trifluoromethylheptyl ester.

The resulting ester compound and 0.13 g of 10% palladium-on-carbon were added to ethanol to conduct debenzylation in a hydrogen atmosphere to obtain 0.39 g of (R)-(+)-4-hydroxybenzoic acid 1-trifluoromethylheptyl ester To 20 ml of acetone were added 0.44 g of 1H,1H-perfluorobutane bromide, 0.33 g of methyl 4-hydroxy-4'-biphenylcarboxylate, and 0.49 g of potassium carbonate, and the solution was allowed to react for 8 hours under reflux with stirring. The reaction mixture was poured into 100 ml of cold water, and the white precipitate formed was collected by filtration. Recrystallization of the crude product gave 0.65 g of methyl 4-1H,1H-perfluorobutyloxy-4'-biphenylcarboxylate. The resulting ester was hydrolyzed in a usual manner to obtain 4-1H,1H-perfluorobutyloxy-4'-biphenylcarboxylic acid, which was then chlorinated with thionyl chloride to obtain 0.65 g of 4-1H,1H-perfluorobutyloxy-4'-biphenylcarboxylic acid chloride.

To 10 ml of methylene chloride were added 0.39 g of (R)-(+)-4-hydroxybenzoic acid 1-trifluoromethylheptyl ester prepared in (1) above and 0.13 g of triethylamine, and a solution of 0.65 g of 4-1H,1H-perfluorobutyloxy-4'-biphenylcarboxylic acid chloride in 10 ml of methylene chloride was slowly added thereto under ice-cooling. After warming the reaction mixture to room temperature, the mixture was stirred for one day. The reaction mixture was poured into water and extracted with methylene chloride. The methylene chloride phase was washed successively with diluted hydrochloric acid, water, an aqueous 1N sodium carbonate solution, and water and dehydrated over anhydrous magnesium sulfate. The solvent was removed by distillation under reduced pressure, and the residual crude product was purified by silica gel column chromatography to obtain 0.57 g of the titled compound.

The resulting compound exhibited liquid crystal characteristics. The phase transition temperatures of the liquid crystal compound obtained were measured by polarizing microscopic observation using a temperature controlled hot stage in which a liquid crystal cell was placed.

Phase Transition Temperatures (°C.):

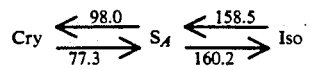

The infrared absorption spectrum (KBr) of the compound is shown in FIG. 1.

EXAMPLE 2

(R)-(+)-4-n-1H,1H,2H,2H-Perfluorooctyloxy-4'-biphenylcarboxylic Acid 4-(1-Trifluoromethylheptyloxycarbonyl)phenyl Ester

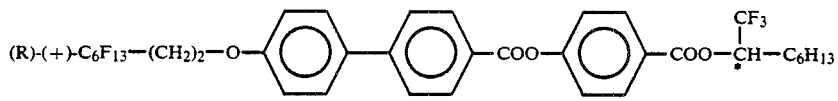

The titled compound was synthesized in the same manner as in Example 1, except for using 4-1H,1H,2H,2H-perfluorooctyloxy-4'-biphenylcarboxylic acid in place of 4-1H,1H-perfluorobutyloxy-4'-biphenylcarboxylic acid.

The resulting compound exhibited liquid crystal characteristics and had the following phase transition temperature as measured in the same manner as in Example 1.

Phase Transition Temperature (°C.):

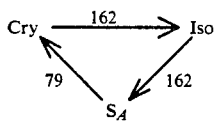

The infrared absorption spectrum (KBr) of the resulting compound is shown in Table 2.

EXAMPLE 3

Ten parts of the compound obtained in Example 1 (Component 2) and 90 parts of a liquid crystal compound having a smectic C phase (Sc* phase) (Component 1) were mixed to prepare a liquid crystal composition. The composition was filled into a liquid crystal cell composed of a pair of glass substrates each having an ITO (indium tin oxide) electrode on which a polyimide orientation film had been coated and subjected to a rubbing treatment (cell thickness: 2.2 μm), the glass substrates being assembled in such a manner that the rubbing directions were in parallel.

The resulting cell was slowly cooled at a cooling rate of 0.1° to 1.0° C./min on a temperature controlled hot stage, and the phase transition behavior was observed under a polarizing microscope equipped with a photomultiplier. As a result, it was revealed that the liquid crystal molecules were orientated in an smectic A phase as shown in Table 1 below and, further, a mono-domain state could be reached in the chiral smectic C phase thereof.

A voltage of ±30 V was applied to the cell to investigate optical response. As a result, an electroclinic effect was observed in a smectic A phase, and optical response of extremely high speed of 18 μsec (Tc −T=30° C.) and a satisfactory contrast was obtained in a chiral smectic C phase.

TABLE 1

| Liquid Crystal Composition | | | Rate of |
|---|---|---|---|
| Component | Amount (wt %) | Phase Transition Temperature (°C.) | Response (μsec) |
| Component 1<br>$C_8H_{17}-O-\bigcirc-\bigcirc-COO-\bigcirc-O-C_8H_{17}$<br>Cry $\underset{71}{\leftrightarrows}$ Sc* $\underset{162}{\leftrightarrows}$ $S_a$ $\underset{178}{\leftrightarrows}$ N* $\underset{180}{\leftrightarrows}$ Iso | 90 | | |
| Component 2<br>(Compound of Example 1)<br>$C_6F_{13}-(CH_2)_2-O-\bigcirc-\bigcirc-COO-\bigcirc-COO-\underset{CF_3}{\overset{}{C}H}-C_6H_{13}$ | 10 | Cry $\underset{67}{\leftrightarrows}$ Sc* $\underset{124}{\leftrightarrows}$ $S_A$ $\underset{184}{\leftrightarrows}$ Iso | 18<br>(Tc − T = 30° C.) |

The similar effects were observed in liquid crystal cells using other compounds obtained in the foregoing examples. The compounds according to the present invention were thus proved useful as a liquid crystal component for constitution of a multi-component mixed liquid crystal composition.

As described above, the optically active compounds according to the present invention are important and useful as a ferroelectric liquid crystal compound per se as well as a component constituting a liquid crystal composition which serves as a chiral dopant for the composition.

The liquid crystal compounds and liquid crystal compositions according to the present invention exhibit satisfactory response performance to an applied electric field and are expected to be applied to liquid crystal display elements, liquid crystal optical shutters, and non-linear optical materials.

Further, the liquid crystal compounds and liquid crystal compositions of the present invention show an electro-clinic effect in their smectic A phase with an applied voltage and are thus applicable to light bulbs and electro-optic shutters.

While the invention has been described in detail and with reference to specific embodiments thereof, it will be apparent to one skilled in the art that various changes

What is claimed is:

1. A liquid crystal compound represented by formula (A):

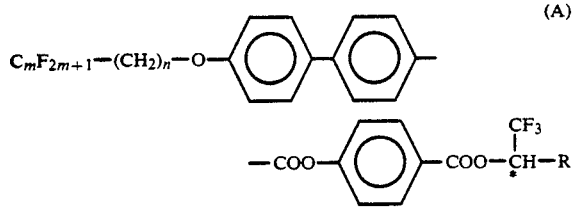

wherein R represents an alkyl group having from 1 to 6 carbon atoms; m represents an integer from 1 to 17; n represents an integer from 1 to 3; $M+n \leqq 18$; and * indicates an optically active center.

2. A liquid crystal compound as claimed in claim 1, wherein the compound is represented by the formula

3. A liquid crystal compound as claimed in claim 1, wherein the compound is represented by the formula

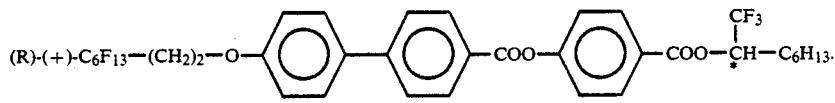

4. A liquid crystal composition comprising at least one optically active compound represented by formula (A):

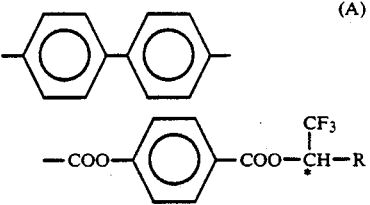

wherein R represents an alkyl group having from 1 to 6 carbon atoms; m represents an integer from 1 to 17; n represents an integer from 1 to 3; $m+n \leqq 18$; and * indicates an optically active center.

* * * * *